US009355094B2

(12) United States Patent
Cuthbert et al.

(10) Patent No.: US 9,355,094 B2
(45) Date of Patent: May 31, 2016

(54) MOTION RESPONSIVE USER INTERFACE FOR REALTIME LANGUAGE TRANSLATION (71) Applicant: Google Inc., Mountain View, CA (US)

(72) Inventors: Alexander J. Cuthbert, Oakland, CA (US); Joshua J. Estelle, San Francisco, CA (US); Macduff Richard Hughes, Los Gatos, CA (US); Sunny Goyal, Mountain View, CA (US); Minqi Sebastian Jiang, San Francisco, CA (US)

(73) Assignee: Google Inc., Mountain View, CA (US)

( * ) Notice: Subject to any disclaimer, the term of this patent is extended or adjusted under 35 U.S.C. 154(b) by 248 days.

(21) Appl. No.: 14/077,411

(22) Filed: Nov. 12, 2013

(65) Prior Publication Data
US 2015/0051898 A1 Feb. 19, 2015

Related U.S. Application Data (60) Provisional application No. 61/865,867, filed on Aug. 14, 2013.

(51) Int. Cl.
*G06F 17/28* (2006.01)
*G06F 3/16* (2006.01)
*G06F 3/0346* (2013.01)
*G06F 17/27* (2006.01)
*G10L 15/00* (2013.01)
*G10L 13/08* (2013.01)
*G10L 15/26* (2006.01)

(52) U.S. Cl.
CPC ............ *G06F 17/289* (2013.01); *G06F 3/0346* (2013.01); *G06F 3/167* (2013.01); *G06F 17/275* (2013.01); *G10L 13/086* (2013.01); *G10L 15/005* (2013.01); *G10L 15/26* (2013.01)

(58) Field of Classification Search
CPC .................................................. G06F 17/2854
See application file for complete search history.

(56) References Cited

U.S. PATENT DOCUMENTS 7,312,981 B2 * 12/2007 Carroll .................. G06F 1/1613
345/169
8,386,231 B2   2/2013 LeBeau
(Continued)

FOREIGN PATENT DOCUMENTS

KR          20130043293          4/2013

OTHER PUBLICATIONS

"SayHi Translate—Voice Translation App for iPhone or iPad for Business," downloaded from the internet on Nov. 7, 2013 at http://www.sayhitranslate.com/, 7 pages.
(Continued)

*Primary Examiner* — Michael N Opsasnick
(74) *Attorney, Agent, or Firm* — Fish & Richardson P.C.

(57) ABSTRACT

A data processing apparatus receives data indicating a movement of a client device by a first user. The apparatus determines that the movement of the client device is a delimiter motion for switching between a first mode, in which the client device is configured to (i) provide a first interface for a first user speaking in a first language and (ii) perform speech recognition of the first language, and a second mode, in which the client device is configured to (i) provide a second interface for a second user speaking in a second language and (ii) perform speech recognition of the second language, the second interface being different from the first interface. Based on determining that the movement is a delimiter motion, the apparatus switches between the first mode and the second mode without the second user physically interacting with the client device.

16 Claims, 5 Drawing Sheets (56) References Cited

U.S. PATENT DOCUMENTS

| | | | | |
|---|---|---|---|---|
| 8,786,636 B2* | 7/2014 | Miyazawa | ............ | G06F 1/1626 |
| | | | | 345/419 |
| 8,793,118 B2* | 7/2014 | Srinivasa | ............. | G09B 21/009 |
| | | | | 704/2 |
| 8,849,628 B2* | 9/2014 | Lauder | ................ | G06F 17/2854 |
| | | | | 703/10 |
| 2003/0115059 A1 | 6/2003 | Jayaratne | | |
| 2010/0030549 A1* | 2/2010 | Lee | ....................... | G06F 1/1626 |
| | | | | 704/4 |
| 2012/0265518 A1* | 10/2012 | Lauder | ................ | G06F 17/2854 |
| | | | | 704/3 |
| 2012/0284014 A1 | 11/2012 | Zivkovic | | |
| 2013/0173246 A1 | 7/2013 | Leung | | |

OTHER PUBLICATIONS

International Search Report and Written Opinion in International Application No. PCT/US2014/044649, mailed Oct. 9, 2014, 10 pages.

* cited by examiner

FIG. 9

MOTION RESPONSIVE USER INTERFACE FOR REALTIME LANGUAGE TRANSLATION

CROSS REFERENCE TO RELATED APPLICATION

This application claims the benefit of U.S. Provisional Application Ser. No. 61/865,867, filed Aug. 14, 2013, which is incorporated by reference.

FIELD

This specification describes technologies related to language translation.

BACKGROUND

Translation may involve more than the activity of a single user translating a sign, menu, message or phrase. With mobile technology and downloadable language applications, translation activity may include exchanges between two or more people.

SUMMARY

Some language translation exchanges may involve a primary user speaking phrases at a client device using a first language, and one or more participating users providing responses in other languages. In some translation applications, a primary user manually taps an icon or button on a display of the client device to switch languages. However, tapping on the client device may be awkward and/or difficult for the primary user to synchronize with the responses of another user. In addition, the other user may be distracted or confused by the need to control or view language selection mechanisms. For the exchange to happen smoothly and accurately in real-time while the primary user maintains control of the client device, the client device detects gestures (e.g., rotation of the device) and dynamically switches between the appropriate languages when the client device is being viewed by the primary user or shown to the participating user. In addition, the client device may show the participating user full screen or large text representations of the text that has been translated from the primary user's voice, keyboard, or other input.

In general, one aspect of the subject matter includes the actions of receiving data indicating a movement of a client device by a first user. The actions also include determining that the movement of the client device is a delimiter motion for switching between a first mode, in which the client device is configured to (i) provide a first interface for a first user speaking in a first language and (ii) perform speech recognition of the first language, and a second mode, in which the client device is configured to (i) provide a second interface for a second user speaking in a second language and (ii) perform speech recognition of the second language, the second interface being different from the first interface. Then, based on determining that the movement is a delimiter motion, the actions include switching between the first mode and the second mode without the second user physically interacting with the client device.

In some implementations, the movement of the client device by the first user is rotation of the client device by the first user.

In some implementations, the first interface for the first user is a transcription of an utterance of the first user and a translation of the utterance into the second language. In some implementations, the second interface for the second user is a full screen translation of an utterance by the first user into the second language.

While the client device is in the first mode, some implementations include the actions of receiving an utterance of the first user in the first language and outputting an audio signal encoding a translation of the utterance into the second language. Additionally, such implementations may include, translating, at the client device, the utterance of the first user into the second language.

While the client device is in the second mode, some implementations may involve receiving an utterance of the second user in the second language and outputting an audio signal encoding a translation of the utterance into the first language.

The details of one or more embodiments of the subject matter described in this specification are set forth in the accompanying drawings and the description below. Other potential features, aspects, and advantages of the subject matter will become apparent from the description, the drawings, and the claims.

Some implementations may advantageously enable participants in a cross-language exchange to communicate without having to touch the screen of a client device.

BRIEF DESCRIPTION OF THE DRAWINGS

Like reference numbers and designations in the various drawings indicate like elements.

DETAILED DESCRIPTION

Applications on a client device may detect user gestures to select appropriate language translation models and change a display on the client device in real-time. In an example scenario, a primary user (e.g., the owner of a client device) wants to communicate with a participating user who speaks a language different than the language of the primary user. For instance, the primary user may be traveling in a different country and need to ask for directions. The primary user speaks while holding the client device in portrait orientation, or uses an alternative method such as keyboard, camera, or handwriting, and then rotates the client device to landscape orientation for presentation to the participating user. When the client device is in portrait orientation, the client device may determine that the primary user is speaking and viewing the display. As a result, the client device may select a language translation model for the language of the primary user and display a transcription of the primary user's speech along with a translation into another language in real-time. When the client device is rotated into landscape orientation, the client device may determine that the primary user is presenting the client device to a participating user. As such, the client device may select a language translation model for the language of the participating user and display a full screen translation of the primary user's speech.

Such applications may provide certain advantages. For example, implementations may remove the need for touching or interacting with the client device in synchronization with the participating user's response, which may be problematic for the primary user. Furthermore, the primary user may not want the participating user to touch their client device. Additionally, the participating user may be reluctant or not understand a device that requires them to touch it, or may be uncomfortable taking that action on another person's client device. These applications may therefore allow participating users to speak a response in a more natural manner.

FIGS. 1 to 8 illustrate an example client device 10 that facilitates an exchange between a primary user speaking a first language and a participating user speaking a second language. While the interaction in FIGS. 1 to 8 is described with reference to one primary user and one participating user, in implementations two or more participating users may be involved. The client device 10 can be, for example, a desktop computer, laptop computer, a tablet computer, a wearable computer, a cellular phone, a smart phone, a music player, an e-book reader, a navigation system, or any other appropriate computing device.

Figure 1:
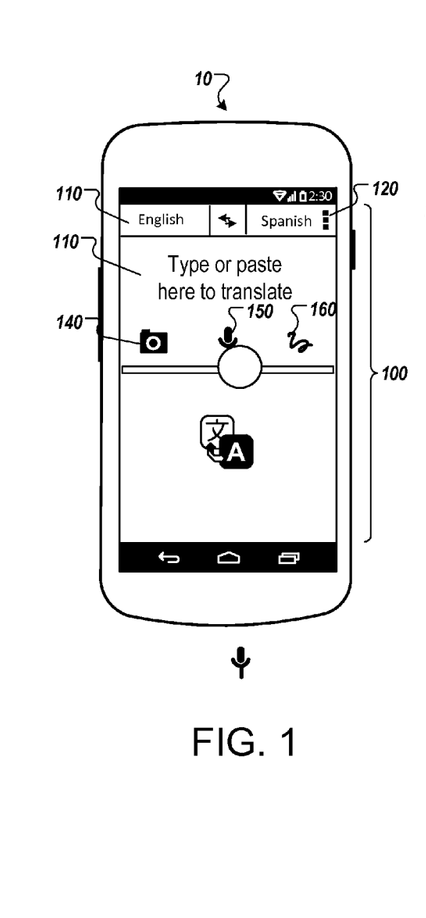
FIGS. 1 to 8 illustrate an example client device that facilitates an exchange between a primary user speaking a first language and a participating user speaking a second language.

In FIG. 1, the client device 10 displays a sample user interface 100 for initiating an exchange between a primary user and a participating user. In operation, a primary user executes a language translation application on the client device 10 through voice or touch-screen input. Upon execution, the language translation application may provide an input screen, such as that shown in FIG. 1. In this regard, FIG. 1 includes an input section for selecting language. The primary user may select a first language using input box 110 and a second language using input box 120. For example, the primary user may select English in the first input box 110 and Spanish in the second input box 120. In this context, the first language is typically the language of the primary user and the second language is typically the language of the participating user. Voice or touch-screen inputs may be used to make the selection. Alternatively or in addition, the language translation application may select a default language to be the first language. This default language may be based on the current language setting of the client device 10. The language translation application also may select a default language to be the second language, which may be a language that is spoken in the current geographic location of the client device 10. For example, if the client device 10 is currently located in Spain, the default second language may be Spanish.

The user may then select a mode for inputting the speech or text that is to be translated. For example, the user may type or paste text into the text box 130, select a camera icon 140 to take a picture of text with a camera coupled to the client device, select a microphone icon 150 to initiate speech recognition, or select a handwriting icon 160 to initiate handwriting recognition. For speech recognition, the user may, for example, select the microphone icon 150 before speaking and then speak an utterance. The client device 10 encodes the utterance into an audio signal, which may be, for example, a snippet of relatively high quality audio, such as 16 kHz lossless audio, and initiates speech recognition of the encoded utterance as described below. For handwriting recognition, the user may, for example, select the handwriting icon 160 and then write and the input area 130 using a digit or stylus. The client device 10 then performs handwriting recognition on the inputted writing.

Figure 2:
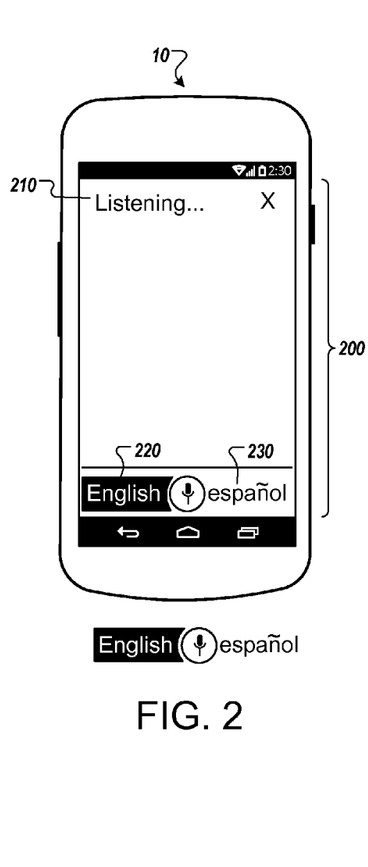

In FIG. 2, the client device 10 displays a sample user interface 200 for initiating a speech recognition session by the primary user. The sample user interface 200 includes a caption "listening" 210 that indicates the client device is waiting for speech input from the primary user. The user interface 200 also includes a graphical indication that the client device 10 is currently translating from English to Spanish. In this example, the "English" icon 220 is highlighted while the "Spanish" icon 230 is not highlighted.

In operation, the client device 10 receives the primary user's speech and converts that speech into audio data. The language translation application obtains the audio data and initiates speech recognition of that audio data.

Speech recognition involves converting the audio data into text representing speech in the user's native language. A speech recognizer may include subroutines for recognizing words, parts of speech, and the like. For example, the speech recognizer may include a speech segmentation routine for breaking sounds into sub-parts and using those sub-parts to identify words, a word disambiguation routine for identifying meanings of words, a syntactic lexicon to identify sentence structure, parts-of-speech, etc., and a routine to compensate for regional or foreign accents in the user's language. The text output by speech recognizer may be a file containing text in a self-describing computing language, such as XML (eXtensible Markup Language), JavaScript Object Notation (JSON), or any other suitable format. Self-describing computing languages may be useful in this context because they enable tagging of words, sentences, paragraphs, and grammatical features in a way that is recognizable to other computer programs. Thus, another computer program, such as a language translator as described below, can read the text file, identify, e.g., words, sentences, paragraphs, and grammatical features, and use that information as needed.

The speech recognition may be performed, for example, by the client device 10, by the server, or by combination of both. For example, the client device 10 may include a speech recognition module that generates a transcription of the primary user speech from the audio data. Alternatively or in addition, the client device 10 may send the audio data to a speech recognition program at a server via a network. The network may be wired or wireless or a combination of both and can include the Internet. In some implementations, identifiers corresponding to the first and second languages may be sent along with the audio data, or before or after the audio data. The speech recognition program at the server receives the audio data and, if applicable, language identifiers from the client device 10. The speech recognition program at the server may then perform speech recognition on the primary user's utterance based on the language identifier associated with the audio data. The server may then transmit a transcription of the primary user's utterance back to the client device 10.

Figure 3:
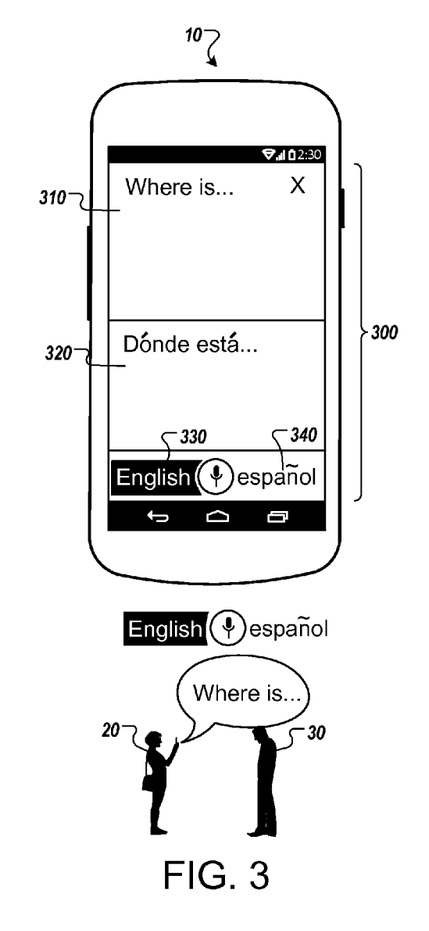

In FIG. 3, the client device 10 displays a sample user interface 300 showing a transcription of the primary user's utterance in the first language and a translation of the primary user's utterance into a second language. The user interface 300 is in a portrait orientation while the primary user is speaking. The user interface 300 includes a top portion 310 displaying a transcription of the primary user's utterance, and a bottom portion 320 displaying the translation of the primary user's utterance into the second language. The user interface 300 also includes an "English" icon 330, which is highlighted to indicate that the client device is translating from English, and a "Spanish" icon 340, which is not highlighted to indicate that the client device is translating into Spanish. FIG. 3 also includes an illustration of the exchange between the primary user 20 and the participating user 30. In this illustration, primary user 20 is initiating a question "where is . . . " to the participating user 30.

The translation of the primary user's speech may be performed by the client device 10, by a translation program at a server, or by a combination of both. For example, the client device 10 may include a language translation module or dictionary for translating the first language (i.e., the language of the primary user) into the second language (i.e., the language of the participating user). In some implementations, the client device 10 may access a translation service via a network, which translates a transcription of the primary user's utterance in the first language into text representing the primary user's utterance in the second language.

In some implementations, a translation program at a server may translate the primary user's utterance into the second language. The translation program may identify the first and second languages, by for example, recognizing identifiers. In some implementations, the second language may be a default language based on the location of the client device 10. In such a case, the translation program may identify the default second language based on, for example, the IP address of the client device, along with any other geographic indicia that it can determine from the audio data. The translation program may then consult a database or any other source to identify the primary language spoken at the geographic location of the client device. If a location is known to be bilingual (e.g., Barcelona, Spain), the translation program may send a message to the client device to prompt the user to select an appropriate language from a list of languages spoken in a location (e.g., Catalan or Spanish for Barcelona). Based on the identified languages, the translation program translates a transcription of the primary user's utterance into text representing the primary user's utterance in the second language. The server may then transmit the text translation back to the client device 10 for display.

The language translation program reads the text file output by the speech recognizer and uses this text file in the primary user's native language to generate a text file for a pre-specified target language (e.g., the language of the participating user). For example, the language translator may read an English-language text file and generate a Spanish-language text file based on the English-language text file. To perform the translation, the language translator identifies the vocabulary and grammar of the English-language text contained in the text file generated by the speech recognizer and uses the tools at its disposal to generate a text file (e.g., an XML file) containing a Spanish-language translation of the English-language text. The language translator may include, or reference, an electronic dictionary that correlates the user's native language to the target language. The language translator may also include, or reference, a syntactic lexicon in the target language to modify word placement in the target language relative to the native language, if necessary. For example, in English, adjectives typically precede nouns. By contrast, in some languages, such as Spanish, (most) adjectives follow nouns. The syntactic lexicon may be used to set word order and other grammatical features in the target language based on, e.g., tags contained in the English-language text file. The output of language translator may be a text file similar to that produced by the speech recognizer, except that it is in the target language. The text file may be in a self-describing computer language, such as XML, JSON, or any other suitable format.

Figure 4:
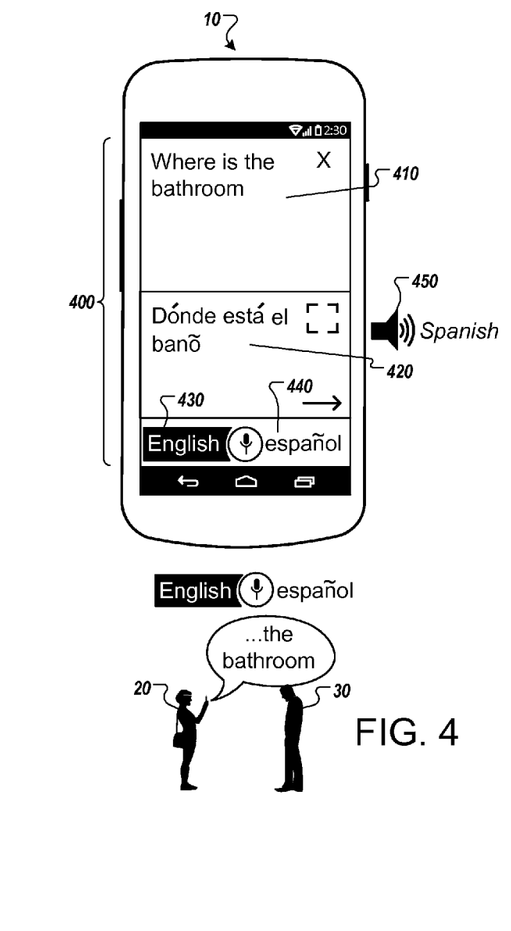

In FIG. 4, the client device 10 displays a sample user interface 400 showing a full transcription of the primary user's utterance and a full translation of the primary user's utterance into the second language. A top portion 410 of the user interface 400 shows the full transcription of the primary user's utterance "where is the bathroom." A bottom portion 420 of the user interface 400 shows the full translation of the primary user's utterance into Spanish "dónde está el baño." The user interface 400 also includes an "English" icon 430, which is highlighted to indicate that the client device is translating from English, and a "Spanish" icon 440, which is not highlighted to indicate that the client device is translating into Spanish. FIG. 4 also includes an illustration of the primary user 20 is completing her question "where is the bathroom" to the participating user 30.

In some implementations, the client device 10 may also output an audio signal corresponding to the translation of the primary user's utterance into the second language. For example, as shown in FIG. 4, a microphone at the client device 10 may output an audio signal 450 corresponding to the primary user's utterance translated into Spanish. The audio signal 450 may be generated by the client device 10, by a server, or by any suitable combination of both.

An audio generator, at the client device or the server, reads the text file output by the language translator and generates audio data based on text in the text file. In particular, the audio generator uses a voice synthesizer to generate audio data corresponding to a text file. The voice synthesizer may use any indicators associated with the generated audio data to affect how the speech is synthesized (e.g., to provide a gender-specific or accent-specific speech type). Since the text file is organized according to the second language (e.g., the participating user's language), the audio data generated is for speech in the second language. In the example illustrated in FIG. 4, the audio generator would read the text file generated by the language translator, and use the Spanish-language text to generate audio data that can be played to generate Spanish speech corresponding to the text. The audio data may be generated with one or more indicators to synthesize speech having accent or gender characteristics. For example, an indicator may specify, to the client device 10, that the resulting speech is for a man or woman. The accent may be specific to the client device on which the audio data is to be played. For example, if the language conversion is from English to Spanish, and the client device is located in Spain, the audio generator may include an indicator to synthesize Spanish speech in a Castilian accent. In cases where the audio generator is located at the server, the server may transmit the audio signal corresponding to the Spanish translation to the client device 10.

The client device 10 obtains the generated audio data for the second language and plays the synthesized speech for the participating user 30. The participating user 30 is thereby able to receive, in his native (or preferred) language, an audible translation of speech provided by the primary user 20 in user 30's native (or preferred) language. In the example shown in FIG. 4, the participating user 30 receives an audio translation into Spanish of the primary user 20's English language speech.

Figure 5:
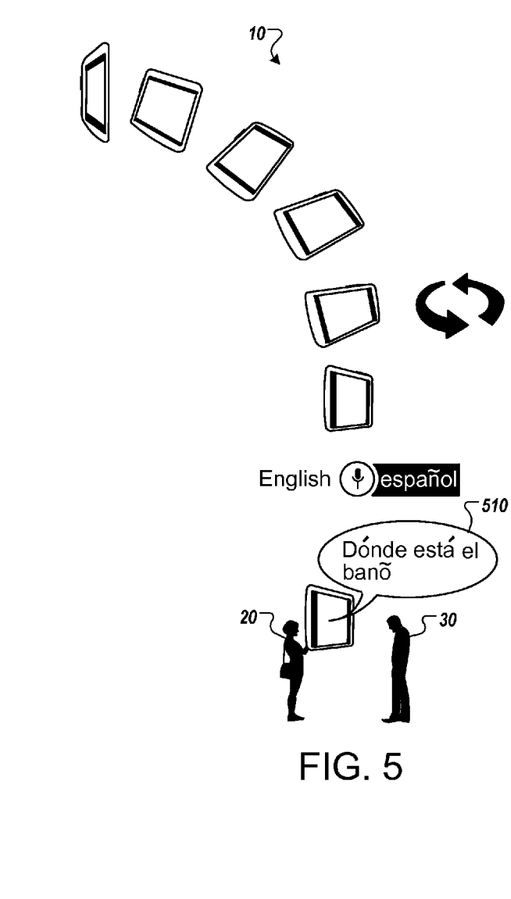

FIG. 5 displays rotation of the client device 10 from portrait to landscape orientation, which triggers a change in the user interface and a change in the language that the client device is listening for. In an example interaction, the primary user 20 speaks into the client device 10 to generate an initial question for the participating user 30 while holding the client device 10 in portrait orientation. When the primary user 20 has completed their question, the primary user then rotates the client device 10 into landscape orientation and presents the screen of the client device for viewing by the participating user 30. While in portrait orientation, the user interface is provided for the convenience of the primary user 20, displaying both a transcription of the primary user speech and a translation of the primary user speech into the second language of the participating user 30, and listening for speech in the language of the primary user 20. However, when the client device 10 is rotated into landscape orientation, the user interface is provided for the convenience of the participating user 30, and therefore displays a full-screen translation of the primary user's speech into the second language of the participating user, and listens for speech in the language of the participating user 30.

While rotation of the client device into landscape and portrait orientations are described for exemplary purposes, any suitable gesture or motion may be used. For example, the client device may detect flipping (e.g., rotation about a horizontal axis) of the client device, and the client device may therefore remain in portrait orientation for both the primary user and the participating user.

FIG. 5 also illustrates output of an audio translation 510 of the primary user's speech into the language of the participating user. The audio translation 510 may be output by the client device 10 as soon as the audio translation becomes available, and need not be delayed to await movement of the client device. In other words, the movement of the client device does not necessarily trigger the output of the audio translation, but rather the audio translation may be output at any time (e.g., while the device is in portrait orientation, while the device is being rotated from portrait orientation into landscape orientation, and/or while the device is in landscape orientation).

The motion of the client device 10 may be detected, e.g., by accelerometers and/or gyroscopes built into the client device, and relayed to the translation application. The translation application then determines whether the motion corresponds to a delimiter motion for switching between a mode for the primary user (e.g., listening for speech in the language of the primary user) and a mode for the participating user (e.g., listening for speech in the language of the participating user). The delimiter motion is a gesture or motion made by the primary user 20 that indicates that the translation application should switch modes. In one example, the delimiter motion of the client device 10 may be determined by detecting that a vector normal to the face of the client device has passed through one or more planes (e.g., a vertical plane and/or a horizontal plane). In this way, it is possible to determine if the client device 10 has been flipped and/or rotated through a predefined angle, thereby indicating that the device has been rotated from portrait to landscape orientation, or rotated from facing the primary user 20 to facing the participating user 30.

Figure 6:
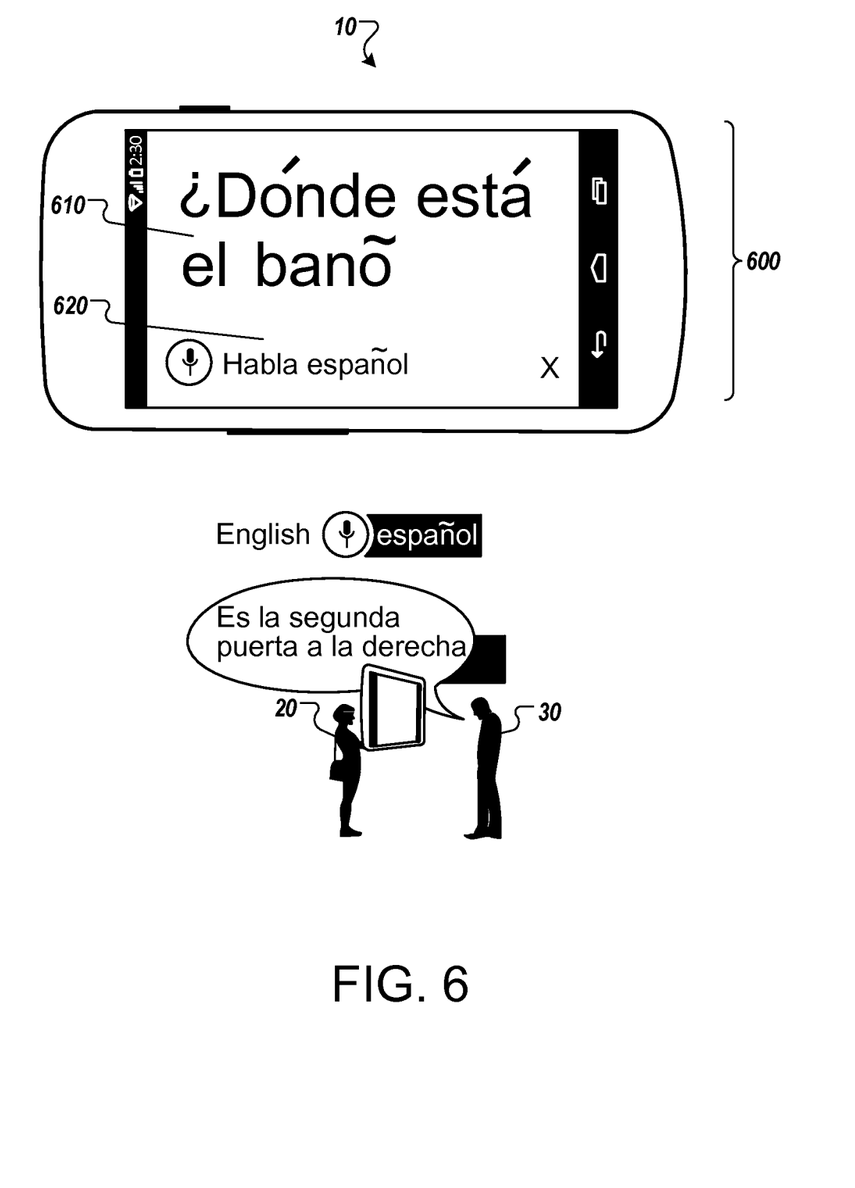

In FIG. 6, the client device 10 displays a sample user interface 600 that shows a full-screen translation of the primary user's speech into the language of the participating user. The user interface 600 shows the translation 610 "¿ Dónde está el baño?" and a small caption 620 ("Habla español") to confirm that the participating user speaks Spanish. FIG. 6 also shows the participating user 30 verbally responding to the primary user's question in the participating user's native language ("es la segunda puerta a la derecha"). The participating user's speech may then be transcribed and translated in a similar manner as described above, except that the initial language will be the participating user's language and the target language will be the primary user's language.

Figure 7:
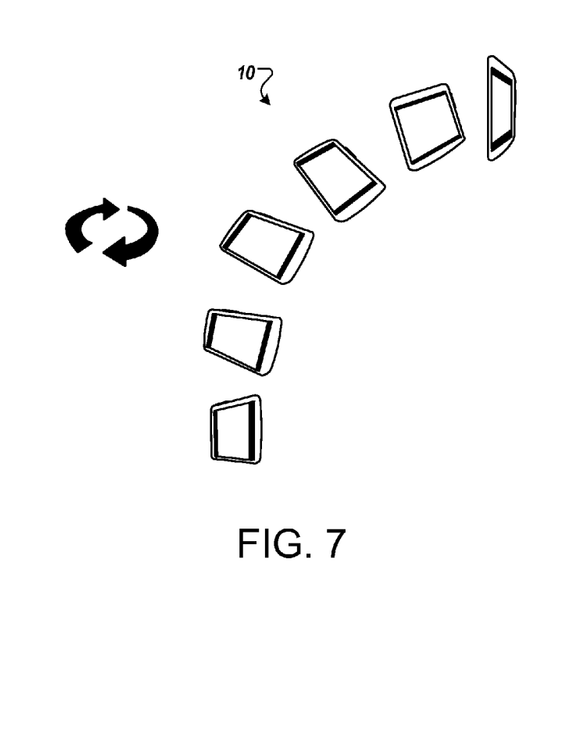

FIG. 7 displays rotation of the client device 10 from landscape to portrait orientation, which triggers a change in the user interface and a change in the language that the client device is listening for as described above.

Figure 8:
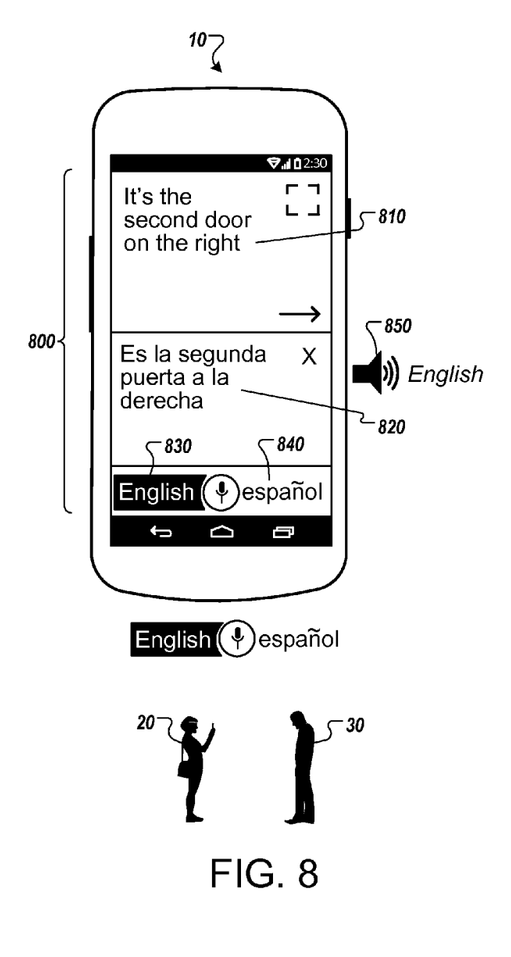

In FIG. 8, the client device 10 displays a sample user interface 800 showing a full transcription of the participating user's utterance and a full translation of the participating user's utterance into the language of the primary user. A top portion 810 of the user interface 800 shows the full translation of the primary user's utterance into English "it's the second door on the right." A bottom portion 820 of the user interface 800 shows the full transcription of the participating user's utterance "es la segunda puerta a la derecha." The user interface 800 also includes an "English" icon 830, which is highlighted to indicate that the client device is translating from English, and a "Spanish" icon 840, which is not highlighted to indicate that the client device is translating into Spanish. The client device 10, a server, or any suitable combination may perform the translation of the participating user's speech into the language of the primary user as described above.

In some implementations, the client device 10 may also output an audio signal corresponding to the translation of the participating user's utterance into the language of the primary user. For example, as shown in FIG. 8, a microphone at the client device 10 may output an audio signal 850 corresponding to the participating user's utterance translated into English. The audio signal 850 may be generated by the client device 10, by a server, or by any suitable combination of both as described above. Also as described above, the audio signal 850 need not be delayed to await rotation of the client device from landscape to portrait orientation.

Notably, the primary user need not interact with client device 10 following the initiation of the exchange. That is, after the translation application has been executed and identifies the two languages, the translation process is automatic from the point of view of the users. There need be no further instructions to, or control of, the translation application to continue translation. Simply rotating the client device will continue the process. In addition, the participating user need not physically interact with the client device 10 (e.g., touch the device, tap the screen of the device, or hold the device) at any point during the conversation.

The foregoing process may be repeated without the primary user providing any additional input (e.g., tapping or swiping) to the client device 10. In particular, the primary user may listen to the translation of the participating user's speech and, after hearing the translation, speak into client device 10 in his native language (e.g., English). In accordance with the process described above, this English speech may be translated to Spanish speech, which may be played on client device 10. The primary user may then rotate the client device into landscape orientation once again and listen for a response from the participating user. Thereafter, the participating user may listen to the English translation and respond in his native language, e.g., Spanish. This back-and-forth process may continue so long as the two wish to converse.

Figure 9:
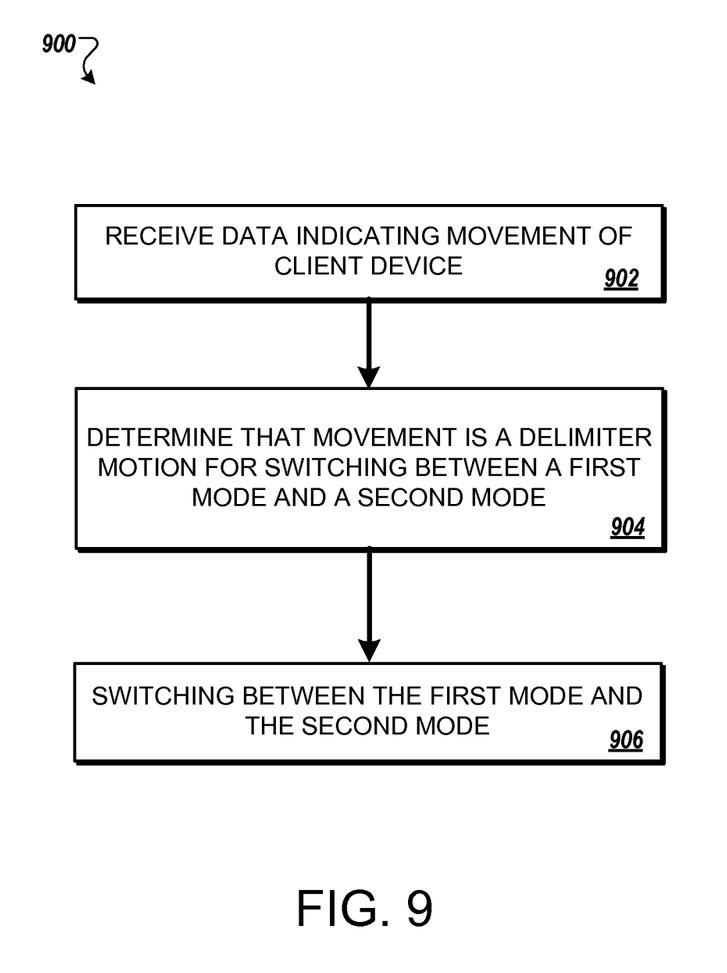
FIG. 9 is a flow chart that illustrates an example of a process for translating between languages.

FIG. 9 illustrates an example of a process 900 for translating between languages. The process 900 may be performed by a client device, such as the client device 10 described above or another client device.

In step 910, the client device receives data indicating a movement of the client device by the first user (e.g., the primary user 20). The movement of the client device may be, for example, rotation of the client device about a vertical or horizontal axis.

In step 920, the client device determines that the movement of the client device is a delimiter motion for switching between two modes. The delimiter motion may correspond to a switch between landscape orientation and portrait orientation of the client device. In the first mode, the client device is configured to provide a first interface for a first user (e.g., a primary user) speaking in a first language and perform speech recognition of the first language (e.g., the language of the primary user). In the second mode, the client device is configured to provide a second interface for a second user (e.g., the participating user) speaking in a second language and perform speech recognition of the second language (e.g., the language of the participating user).

The first interface and the second interface may be different. For example, in the first mode the client device may display both a transcription of an utterance of the first user and a translation of the utterance into a second language. In the second mode, the client device may display a full-screen translation of the utterance of the first user into the second language.

Then, in step 930, based on determining that the movement was a delimiter motion, the client device switches between the first mode and the second mode without the second user physically interacting with the client device. In other words, the second user need not physically interact with the client device 10 (e.g., touch the device, tap the screen of the device, or hold the device) at any point during a conversation.

In some implementations, while the client device is in the first mode, the client device may receive an utterance of the first user in the first language. The client device may then output an audio signal encoding a translation of the utterance into the second language. The audio signal may be output while the client device is in the first mode, while the client device is being switched between the first mode and the second mode, and/or while the client device is in the second mode. In some aspects, the client device may generate the audio signal encoding the translation. Alternatively or in addition, the client device may transmit the utterance of the first user to a server, and receive an audio signal corresponding to a translation of the utterance from the server.

In some implementations, while the client device is in the second mode, the client device may receive an utterance of the second user in the second language. The client device may then output an audio signal encoding a translation of the utterance into the first language. The audio signal may be output while the client device is in the first mode, while the client device is being switched between the first mode and the second mode, and/or while the client device is in the second mode. In some aspects, the client device may generate the audio signal encoding the translation. Alternatively or in addition, the client device may transmit the utterance of the second user to a server, and receive an audio signal corresponding to a translation of the utterance from the server.

A number of implementations have been described. Nevertheless, it will be understood that various modifications may be made without departing from the spirit and scope of the disclosure. For example, various forms of the flows shown above may be used, with steps re-ordered, added, or removed.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer-readable medium for execution by, or to control the operation of, data processing apparatus. The computer readable-medium may be a machine-readable storage device, a machine-readable storage substrate, a memory device, a composition of matter affecting a machine-readable propagated signal, or a combination of one or more of them. The computer-readable medium may be a non-transitory computer-readable medium. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the techniques disclosed, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Thus, particular embodiments have been described. Other embodiments are within the scope of the following claims. For example, the actions recited in the claims may be performed in a different order and still achieve desirable results.

What is claimed is:

1. A computer-implemented method comprising:
receiving data indicating a movement of a client device by a first user;
determining that the movement of the client device is classified as a delimiter motion for; and
based on determining that the movement is classified as a delimiter motion, switching between a first mode, in which the client device (i) configures a language setting of an automated speech recognition engine to transcribe the speech of the first user into text that is in the first language, and (ii) provides a first interface that includes the transcribed text of the first user that is in the first language, and a translation of the transcribed text of the first user that is in a second language, and a second mode, in which the client device (i) configures the language setting of the automated speech recognition engine to transcribe the speech of a second user into text that is in the second language, and (ii) provides a second interface that includes the transcribed text of the second user that is in the second language, and a translation of the transcribed text of the second user that is in the first language, wherein the second interface is different from the first interface, and wherein switching between the first mode and the second mode occurs without the second user physically interacting with the client device.

2. The method of claim 1, wherein the movement of the client device by the first user comprises rotation of the client device by the first user.

3. The method of claim 1, further comprising, while the client device is in the second mode,
receiving an utterance of the second user in the second language; and
outputting an audio signal encoding the translation of the transcribed text of the second user that is in the first language.

4. The method of claim 1, wherein the client device configures the language setting of the automated speech recognition engine to transcribe the speech of the first user into text that is in the first language by providing an identifier indicating to the automated speech recognition engine that the speech is in the first language.

5. The method of claim 1, wherein the automated speech recognition engine executes on a server that is remote from the client device.

6. The method of claim 1, further comprising, while the client device is in the first mode,
receiving an utterance of the first user in the first language; and
outputting an audio signal encoding the translation of the transcribed text of the first user that is in the second language.

7. The method of claim 6, further comprising, while the client device is in the first mode,
translating, at the client device, the utterance of the first user into the second language.

8. A client device comprising:
one or more computers and one or more storage devices storing instructions that are operable, when executed by the one or more computers, to cause the one or more computers to perform operations comprising:
receiving data indicating a movement of a client device by a first user;
determining that the movement of the client device is classified as a delimiter motion for; and
based on determining that the movement is classified as a delimiter motion, switching between a first mode, in which the client device (i) configures a language setting of an automated speech recognition engine to transcribe the speech of the first user into text that is in the first language, and (ii) provides a first interface that includes the transcribed text of the first user that is in the first language, and a translation of the transcribed text of the first user that is in a second language, and a second mode, in which the client device (i) configures the language setting of the automated speech recognition engine to transcribe the speech of a second user into text that is in the second language, and (ii) provides a second interface that includes the transcribed text of the second user that is in the second language, and a translation of the transcribed text of the second user that is in the first language, wherein the second interface is different from the first interface, and wherein switching between the first mode and the second mode occurs without the second user physically interacting with the client device.

9. The client device of claim 8, wherein the movement of the client device by the first user comprises rotation of the client device by the first user.

10. The client device of claim 8, wherein the operations further comprise, while the client device is in the second mode,
receiving an utterance of the second user in the second language; and
outputting an audio signal encoding the translation of the transcribed text of the second user that is in the first language.

11. The client device of claim 8, wherein the operations further comprise, while the client device is in the first mode,
receiving an utterance of the first user in the first language; and
outputting an audio signal encoding the translation of the transcribed text of the first user that is in the second language.

12. The client device of claim 11, wherein the operations further comprise, while the client device is in the first mode,
translating, at the client device, the utterance of the first user into the second language.

13. A non-transitory computer-readable medium storing software comprising instructions executable by one or more computers which, upon such execution, cause the one or more computers to perform operations comprising:
receiving data indicating a movement of a client device by a first user;
determining that the movement of the client device is classified as a delimiter motion for; and
based on determining that the movement is classified as a delimiter motion, switching between a first mode, in which the client device (i) configures a language setting of an automated speech recognition engine to transcribe the speech of the first user into text that is in the first language, and (ii) provides a first interface that includes the transcribed text of the first user that is in the first language, and a translation of the transcribed text of the first user that is in a second language, and a second mode, in which the client device (i) configures the language setting of the automated speech recognition engine to transcribe the speech of a second user into text that is in the second language, and (ii) provides a second interface that includes the transcribed text of the second user that is in the second language, and a translation of the transcribed text of the second user that is in the first language, wherein the second interface is different from the first interface, and wherein switching between the first mode and the second mode occurs without the second user physically interacting with the client device.

14. The computer-readable medium of claim 13, wherein the movement of the client device by the first user comprises rotation of the client device by the first user.

15. The computer-readable medium of claim 13, wherein the operations further comprise, while the client device is in the first mode,
receiving an utterance of the first user in the first language; and
outputting an audio signal encoding the translation of the transcribed text of the first user that is in the second language.

16. The computer-readable medium of claim 15, wherein the operations further comprise, while the client device is in the first mode,
translating, at the client device, the utterance of the first user into the second language.

\* \* \* \* \*